United States Patent [19]

Herstel et al.

[11] 3,925,561

[45] Dec. 9, 1975

[54] METHOD FOR IMPARTING COLOR TO TEXTURIZED VEGETABLE PROTEIN

[75] Inventors: Henk Herstel; Godefridus Antonius Maria van den Ouweland, both of Zevenaar, Netherlands

[73] Assignee: Lever Brothers Company, New York, N.Y.

[22] Filed: Feb. 19, 1974

[21] Appl. No.: 443,552

[30] Foreign Application Priority Data
Feb. 26, 1973 United Kingdom............... 9235/73

[52] U.S. Cl................................ 426/250; 426/540
[51] Int. Cl.²....................................... A23L 1/275
[58] Field of Search........... 426/104, 177, 212, 250, 426/268, 364, 540

[56] References Cited
UNITED STATES PATENTS

| | | | |
|---|---|---|---|
| 2,682,466 | 6/1954 | Boyer.................................. | 426/104 |
| 2,802,737 | 8/1957 | Anson et al......................... | 426/364 X |
| 3,093,483 | 6/1963 | Ishler et al......................... | 426/152 X |
| 3,403,027 | 9/1968 | Page et al.......................... | 426/250 |
| 3,488,770 | 1/1970 | Atkinson............................. | 426/104 |

*Primary Examiner*—James R. Hoffman
*Attorney, Agent, or Firm*—Kenneth F. Dusyn; Arnold Grant; Melvin H. Kurtz

[57] ABSTRACT

Extruded texturized vegetable protein products that are obtained by extruding protein-containing vegetable material, e.g. soya meal, are given a brown color component by adding to the mixture fed to the extruder wherein the material is cooked and texturised, a $C_5$ sugar or phosphate ester of a $C_5$ sugar.

5 Claims, No Drawings

METHOD FOR IMPARTING COLOR TO TEXTURIZED VEGETABLE PROTEIN

This invention relates to foodstuffs containing vegetable proteins and is particularly but not exclusively applicable to the texturized protein-containing food product made by extruding a dough made of defatted soya meal to give a non-expanded product as described in co-pending application Ser. No. 265,401, now abandoned.

When these texturized products are required to stimulate dark colored foodstuffs, e.g. meat, the color of the texturized product presents a problem because it is generally too light. It is therefore necessary to impart a darker brown color to these texturized products. When it was attempted to do this with certified food dyes, it was found that all readily available known brown dyes were leached out of the product during rehydration or cooking in the presence of water. The certified brown color lakes, although generally not leached out, have been found to be unreliable when used with vegetable protein products; thus the brown lake blend 9053 (ex Warner Jenkins) imparts a greyish color to the soya meal based products of co-pending application Ser. No. 265,401.

Certain natural colors impart a satisfactory brown color to texturized vegetable protein products but these natural colors also have disadvantages; thus paprika oleoresin has a marked odor and taste which are frequently unacceptable in food preparations, and carotenes are relatively expensive.

It has however surprisingly been found that satisfactory low cost brown color, which will not be leached out with water, and which is not associated with any noticeable odor or taste, can be imparted to texturized vegetable protein products if a small proportion of a $C_5$ sugar or a phosphate ester of a $C_5$ sugar is heated with the vegetable protein composition, by incorporating the sugar in the mixture (dough) fed to the extruder wherein the protein-containing vegetable material (e.g. defatted soya meal) is cooked and texturized.

The brown colored texturized vegetable protein so obtained has moreover the property of being more reliably dyed with certified colored lakes than texturized vegetable protein material not treated, as indicated in the preceding paragraph. It has also been found that texturized vegetable protein material which has been colored brown, as just indicated, can easily be further modified in color to give the color of particular types of foodstuffs, e.g. specific cooked meals, by adding to the mixture minor amounts, in relation to the $C_5$ sugar or its phosphate ester, of known food coloring agents including certified colored lakes.

It has long been known that the reaction of sugars, including $C_5$ sugars and their phosphate esters, with proteins, yields so-called Maillard reaction products which impart desirable aromas and flavors to foodstuffs, as well as producing brown colored products. It is surprising to find that $C_5$ sugars and their phosphate esters, when added to the vegetable protein mixtures fed to the extruder to produce texturized protein products, give a more intense brown color than is the case when the same sugar-containing, vegetable protein mixture is heated in an autoclave under the same conditions of temperature, time and pressure.

This means that, for given color intensity, less sugar or phosphate ester thereof is required when operating in an extruder than in an autoclave, which is of advantage since the reaction of sugars with proteins involves a loss of nutritionally valuable amino acids (especially lysine, arginine and histidine).

Accordingly the present invention provides a process for imparting to an extruded texturized vegetable protein product a brown color which will not be leached out with water and which is not associated with any noticeable odor or taste, by incorporating in the mixture fed to the extruder wherein the proteincontaining vegetable material is cooked and texturized, a small proportion of a $C_5$ sugar or a phosphate ester of a $C_5$ sugar. The amount of added $C_5$ sugar is preferably not more than 10% by weight of the protein present and will vary with the degree of brown coloring required in the texturized product. From 2% to 3% by weight of a $C_5$ sugar based on the weight of dough generally provides a satisfactory brown color when added to a dough made from defatted soya meal with a protein content of 50%–60% by weight.

The process of the present invention is frequently carried out with the addition of known coloring agents as indicated above, and the amount of such coloring agents is not more than 60% of the amount of $C_5$ sugar added and useful results can be obtained with amounts of coloring agents which are from 1% to 30% by weight of the $C_5$ sugar present.

The known coloring agents, e.g. certified dyes and lakes and natural colors, can be used to produce in the resulting texturized vegetable protein product a shade of brown or red-brown appropriate to various types of food, e.g. mushrooms, fish or meat cooked in different ways.

It is generally preferable in accordance with the present invention to add some lysine or other basic amino acid to the sugar or ester-containing vegetable protein mix fed to the extruder to get a more intense brown color and to compensate for the lysine lost by reaction with the sugar, thereby leaving substantially undiminished the nutritional value of the vegetable protein. The amount of such added amino acid is conveniently from one tenth to ten-fold the amount (by weight) of the sugar or ester used.

For the sake of brevity in the present description and the appended claims references are made only to the relative proportions of $C_5$ sugars and food coloring agents and amino acids; it is intended that these references include also proportions related to the phosphate esters of $C_5$ sugars, such proportions being modified to take into account the difference in molecular weights between the sugars and the esters.

The invention is further illustrated by the following examples:

EXAMPLE I

A texturised protein-containing food product was obtained by extruding in a Troester UP 30/15 UD extruder a defatted soya meal dough containing by weight 30% water, 2% fat and different amounts of lysine and xylose, as indicated below, as described in copending application Ser. No. 265,401.

The conditions for the extruder were:

| | |
|---|---|
| rotational speed of extruder screw | 30 rpm |
| die diameter | 8 mm |
| temperature of the screw tip surface | 148°C |
| residence time in the extruder chamber | 1.5 min. |

| | -continued | |
|---|---|---|
| pressure in the extruder chamber approx. | | 6 atm. |

The strand of textured extruded product was cut at the die exit into bits of 8 mm length. These bits were dried for 2 hours at 60°–65°C. The bits obtained were milled and sieved and the degree of browning was determined by measuring reflectance of comminuted bits with a Unicam SP 800 spectrometer equipped with a Unicam SP 890 diffuse reflectance accessory.

A defatted soya meal dough as just described, with the same amounts of lysine and xylose was placed in a 250 ml autoclave. The temperature of the contents of the autoclave was raised to 148°C and held at that temperature for 1.5 minutes by placing the autoclave in an oilbath of 170°C. The pressure in the autoclave increased to approximately 5 atm. Thereafter the autoclave was cooled and the product was dried for 2 hours at 60°–65°C, milled and sieved. The degree of browning was determined by measuring the reflectance.

The results of the reflectance determinations are summarised in the following Table I.

| Sample | Ex-truded; 500mμ | reflec-tance % 600mμ | Auto-claved; 500mμ | reflec-tance % 600mμ |
|---|---|---|---|---|
| 0.5% lysine + 0.5% xylose | 13 | 31 | 28 | 50 |
| 1.0% lysine + 1.0% xylose | 8.5 | 23 | 30 | 50 |
| 2.0% xylose | 7.1 | 20 | 21 | 43 |

From this Table 1 it will be noted that the extruded material, for a given xylose content, always gives a lower reflectance figure, indicating a darker brown color.

In order to produce in the above-described products, colors resemble various types of meat, it is generally required to modify the brown color produced by the use of a $C_5$ sugar (or its derivative) alone, by a certain amount of a known food dye. The following Examples (summarized in Table II) show how the color of specific types of meat have been simulated by preparing bits as described in Example 1, and adding to the dough fed to the extruder, the indicated amounts of xylose and known food dyes.

Table II

| Ex-ample | Added colourants per kg. meal | Colour simulates |
|---|---|---|
| 2 | 5 g xylose<br>0.06 g erythrosine | processed meat (light-brown with pink-red undertone) |
| 3 | 10 g xylose<br>0.4 g brown lake blend 9053 | boiled beef |
| 4 | 2.5 g xylose<br>10 g lysine HCl.<br>0.6 g brown lake blend 9053<br>0.25 g red lake blend 9336 | ham |
| 5 | 2.5 g xylose<br>10 g lysine HCl.<br>0.25 g red lake blend 9323 | boiled veal |

What is claimed is:

1. A process for imparting a brown color that will not be leached out with water and which is not associated with any noticeable odor or taste, to an extruded texturized vegetable protein product, which comprises incorporating in the mixture fed to an extruder wherein the protein-containing vegetable material is cooked and texturized at a temperature between 120° and 170°C, a proportion sufficient to impart said color in the texturized product but which is not more than 10% by weight, based on the amount of protein present, of a $C_5$ sugar or a phosphate ester of a $C_5$ sugar.

2. A process as claimed in claim 1, in which the color of the protein product is further modified to a brown or red-brown color by incorporating in the mixture fed to said extruder a suitable food-coloring agent in an amount of not more than 60% of the amount of $C_5$ sugar added.

3. A process as claimed in claim 1, in which an amino acid is added to the mixture fed to the extruder in an amount which is from one tenth to ten times the amount of $C_5$ sugar added.

4. A colored, texturized, vegetable protein product prepared by the process defined in claim 1.

5. A foodstuff containing a colored, texturized, vegetable protein product prepared by the process defined in claim 1.

* * * * *